United States Patent Office 3,212,261
Patented Oct. 19, 1965

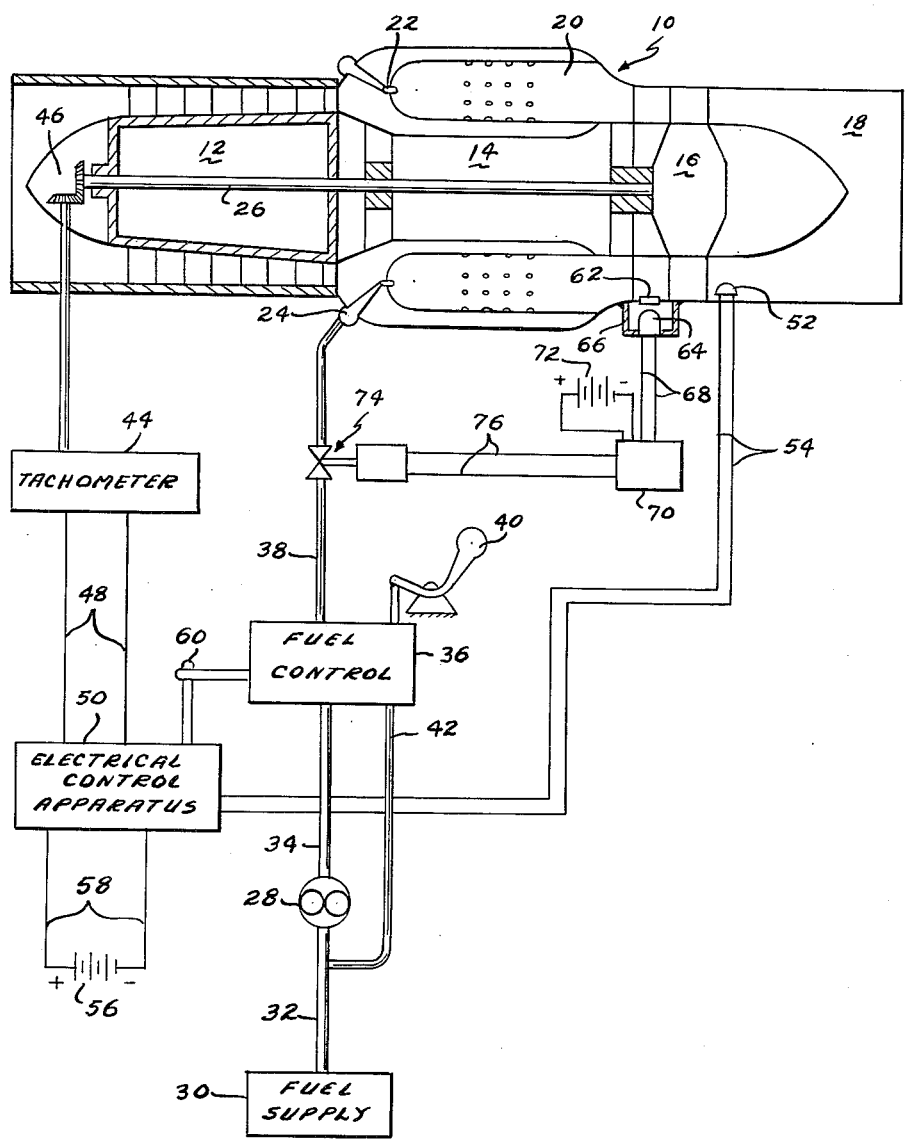

3,212,261
ULTRAVIOLET LIGHT SENSITIVE FUEL MODULATING APPARATUS FOR TURBINE ENGINES
John J. Rose, 318 Dellwood Ave., Dayton, Ohio
Continuation of application Ser. No. 158,917, Dec. 12, 1961. This application Nov. 25, 1964, Ser. No. 415,856
3 Claims. (Cl. 60—39.28)
(Granted under Title 35, U.S. Code (1952), sec. 266)

This is a continuation of patent application Serial Number 158,917, Control Apparatus, which was filed December 12, 1961, now abandoned.

The invention described herein may be manufactured and used by or for the United States Government for governmental purposes without the payment to me of any royalty thereon.

This invention relates to fuel control systems used on turbojet and turboprop engines, and more specifically to override apparatus for restricting or modulating the normal fuel flow during periods of overcombustion.

Engines of the type to which this invention relates must be built and operated at near optimum conditions. Extreme care must be exercised in the selection of materials which are then deliberately highly stressed for maximum weight reduction. Likewise, such engines are normally operated at extremely high rotative speeds at just below optimum temperature.

It has always been a problem in the operation of such engines to provide a control apparatus which could accurately weigh the various parameters such as altitude, ambient temperature, humidity, engine r.p.m., calorific value of the fuel and combustion temperature to rapidly and accurately control the fuel flow to the engine. The most sensitive and critical control parameter is the temperature of the gases leaving the combustion section of the engine. Engines of the type to which this invention applies, being heat engines, must be operated at the highest permissible temperature for maximum efficiency. Temperature of the emitting products of combustion is the most critical of all control parameters because of the destructive effect, yet a change in temperature cannot be instantaneously detected with thermo sensitive detection devices.

One of the most critical mechanical elements of a turbine engine is the turbine blades which operate immediately downstream in the emitting products of combustion. It has always been a severe problem to protect the turbine blades from a sudden overtemperature which would be destructive, or which would reduce their normal operating life. The turbine blades operate at a normal temperature which will make them appear "cherry red" and clearly visible in the spectrum. Pyrometer controls have been proposed which would be sensitive to the spectrum of the radiated light from the turbine blades. As with thermo sensitive devices, the problem remains that the engine element to be protected must itself first respond to the destructive temperature.

The common practice of determining the gas temperature in the turbine area has been by the use of bi-metallic thermocouples, the variable output of which is related to the temperature being measured. Thermocouples are used for want of something better. They are plagued with two problems: (1) the engine temperatures approach the destructive temperature of the thermocouple, and (2) the thermocouple itself must first respond to the temperature change before it can change its output, resulting in a delayed signal.

A turbine engine may, under certain conditions, go into extreme malfunctioning so severe that if not immediately corrected, the engine can destroy itself. Two of such malfunctioning conditions are known as "compressor surge" and "compressor stall," conditions which are well known to the art and require no further definition. When an engine goes into any malfunctioning condition, there is an immediate and violent reaction throughout the entire engine; a reaction with which the ordinary control system cannot cope in a rapid enough manner.

Under the malfunctioning conditions, the volume of air flowing into the combustion section of the engine is reduced, and since the fuel flow is not likewise immediately reduced, an overtemperature will result which may be destructive to the turbine blades. Before the fuel flow can be reduced, the overtemperature must react on the thermocouples which, in turn, signal the overtemperature to the proper electrical element of the fuel control system. In the meantime, the excess fuel flow continues to the engine, resulting in still greater overtemperature.

This invention embodies a novel concept for an override to a conventional engine control system which will modulate the fuel flow only during periods of overcombustion; being completely dormant and having no influence on fuel flow during normal engine operation. This invention uses an optical detector sensitive to a narrow band of the spectrum in the flame of combustion, rather than to the temperature of combustion. It is well known that, within operational limits, the length of the flame emitting from a combustion chamber such as used in a turbine engine bears a relationship to the amount of fuel being combusted. Engines are designed to have the turbine blades downstream from the actual flame, yet must be close enough to take full advantage of the heat being emitted. One of the most destructive conditions exists when the flame becomes long enough to actually enter the turbine blades. Since an overtemperature is the result of overcombustion from an excess fuel to air ratio which produces a flame of above normal length, the overcombustion may be immediately detected from the flame position rather than waiting to detect the delayed thermal effect produced by the flame. Accordingly, this invention adapts a detector, sensitive to ultraviolet light, to immediately detect when the tip of the ultraviolet cone within the flame of combustion reaches a predetermined position between the downstream end of the combustion chamber and the turbine. The detector instantly relays this information to a control unit for an immediate reduction of fuel. The fuel reduction apparatus may be incorporated into the housing of the main fuel control, or it may be placed at any convenient position in the fuel line between the fuel control and the fuel manifold as shown on the drawing. The specific location is not important, the only requirement being that the apparatus constituting this invention be located where it can override and modulate the fuel which would otherwise be combusted by the engine. Likewise, the drawing depicts the ultraviolet light sensing detector as being ahead of the turbine section. This detector could be placed at any position from which it may accomplish its mission; the exact position being established by the particular design of the engine on which used. Likewise, one or more ultraviolet light detectors may be used, the detectors being located at various axial locations on the engine, or, placed circumferentially about the engine at a common axial location.

The primary object of this invention is to provide a fuel modulating apparatus which will restrict or modulate the fuel flow during periods of overcombustion in a turbine engine and which will remain dormant during normal operating conditions.

Another object of this invention is to provide a fuel modulating apparatus which uses an ultraviolet sensitive detector to generate the actuating signal when the flame of combustion reaches a predetermined length.

A further object of this invention is to provide a fuel modulating apparatus using an optical detector which can be mounted on the turbine engine in a position where it will not be subjected to the destructive effect of the high temperatures generated by a turbine engine.

Yet another object of the present invention is to provide a fuel modulating apparatus using an optical detector in order to generate a response signal faster than that which can be generated by thermally sensitive detectors.

A still further object of this invention is to provide a fuel modulating apparatus which is readily adaptable to existing engines and fuel control systems.

And yet another object of this invention is to provide a fuel modulating apparatus of extreme reliability, simplicity of operation, and one requiring a minimum amount of servicing in use.

Additional objects, advantages and features of the invention reside in the construction, arrangement and combination of parts involved in the embodiment of the invention as will appear from the following description and accompanying drawing.

The drawing, which is in schematic, shows a gas turbine engine referred to generally as engine 10, the major sections of which include a compressor 12, a combustion section 14, a turbine section 16 and a nozzle 18. The combustion section includes a plurality of combustion chambers or cans 20 each of which has a fuel nozzle 22 fed from a common fuel manifold 24. The compressor 12 and turbine 16 are innerconnected by common shaft 26 and rotate as a unit.

Fuel is supplied to the engine 10 by means of fuel pump 28 which pumps the fuel from the fuel supply 30 through conduit 32 and delivers it through conduit 34 to the fuel control 36 which meters the fuel and passes it through conduit 38 into fuel manifold 24. The fuel control lever 40, which is pilot operated, programs the fuel requirement for desired engine power output as established by the manifold 24 fuel pressure. The surplus fuel delivered by pump 28 to the fuel control 36 is returned to the inlet side of the pump through bypass conduit 42.

A speed sensor or tachometer 44, which is shaft driven through suitable gearing 46, has an electrical output proportional to the rotative speed of the engine. The electrical output from the tachometer is fed into the electrical control apparatus 50 through wires 48. A temperature responsive device 52, located downstream from the combustion section, likewise feeds an electrical signal proportional to the temperature into the electrical control apparatus 50 through wires 54. A power source 56 energizes the electrical control apparatus 50 through wires 58. The electrical control apparatus feathers the fuel flowing through the fuel control by means of linkage 60, using engine rotative speed and temperature as control parameters. The temperature responsive device 52 may be located behind the turbine as shown to respond to turbine out temperature, or may be located directly in front of the turbine section to respond to turbine inlet temperature.

A window 62 of quartz or other suitable transparent and heat resistant material is built into the outer shell of the engine in the area between the discharge end of the combustion can and the turbine. An ultraviolet detector unit 64 is supported by bracket 66 in such superimposed position as will permit the detector to scan through the window and become energized by any ultraviolet light falling within the scanning angle of the detector tube. The ultraviolet detector should be installed in such a position where it may be oriented to render it insensitive to a flame of normal length and where it will be activated only by the ultraviolet cone within the combustion flame of longer than normal length. The flame emitting from a combustion can has a wide spectrum ranging from ultraviolet to infrared. As is well known and is clearly seen on a Bunsen burner, a flame has a small cone of intense light at the core of the flame. This is the source of the ultraviolet light to which the detector is sensitive. The length of this cone will vary with the flame length and bears a relationship to the overall flame length. The detector used is sensitive only to ultraviolet light and is axially positioned where the scanning angle of the detector is downstream from the ultraviolet generating portion of a normal length flame. When the length of the flame increases sufficiently to place the tip of the ultraviolet generating portion of the flame within the scanning angle of the detector, a signal is generated and the modulating apparatus becomes operative. The ultraviolet detector 64 which is used on the apparatus constituting this invention is the Edison Solar Blind Ultraviolet Radiation Detector manufactured by the McGraw-Edison Company. This detector is insensitive to sunlight, cosmic radiation, infrared and ordinary incandescent and fluorescent light sources. The insensitivity of the detector to other than ultraviolet light makes it especially adapted for external engine mounting where it will be adequately cooled. The spectral range of the detector is 1900–2900 angstroms; peaking at 2200 angstroms.

The output signal from the ultraviolet detector 64 is fed into control unit 70 through wires 68. The control unit is energized by a power source 72 which may or may not be the same as power source 56. A control valve 74 is placed in conduit 38 as shown. The control valve may be of any desired form, the only requirements being that it have a full open position which does not impede the flow in the conduit and that it have a closed position which only restricts or modulates the fuel which would otherwise flow to the engine as established by the main fuel control 36. The valve shown is a solenoid operated valve having a normally open position, and which is adjustable to close only partially to modulate to a predetermined percentage of normal flow. The control valve is energized by control unit 70 through wires 76. The control valve could also be in the form of a solenoid operated gate valve in which a hole of predetermined size is drilled through the valve plug to permit fuel flow when the valve is closed.

During normal engine operation, the ultraviolet detector has no influence upon the control of the engine. However, when there is a predetermined excess in flame length indicating a fuel excess, the ultraviolet detector 64, acting through control unit 70, will immediately override the fuel control and modulate the flow to a safe limit until such time as the flame length recedes to normal. After the flame length has returned to normal, the ultraviolet detector will become de-energized to thereby cancel out the signal to control unit 70 which will permit the solenoid valve 74 to return to its normally open position and return control of the engine to the main fuel control.

The modulating apparatus disclosed, although incorporated into the main fuel system of a turbine engine, has no function during normal engine operation. It becomes operative only during periods of overcombustion, and again becomes dormant when engine operation becomes normal. The fuel flow is not cut off during periods of overcombustion, there being no intent of stopping the engine, but merely to keep it within safe operating limits.

It is to be understood that the embodiment of the present invention as shown and described is to be regarded as illustrative only and that the invention is susceptible to variations, modifications and changes within the scope of the appended claims.

I claim:

1. A fuel modulating apparatus for modulating the normal fuel flow during periods of overcombustion in a turbine engine having an outer shell supporting a combustion section and a turbine section aft from the combustion section, and further having a fuel supply including a fuel conduit means regulated by a fuel control for supplying fuel to the combustion section of the engine; said modulating apparatus comprising: a modulating control valve in the fuel conduit means between the fuel control and the combustion section of the engine, an ultraviolet light detector adapted for mounting on the outer shell of the engine and axially located to be sensitive to the ultraviolet light in the flame of combustion during an overcombustion condition, and a control unit disposed between said modulating control valve and said ultraviolet light detector, said control unit receiving an output signal from said ultraviolet light detector during a period of overcombustion and actuating said modulating control valve to modulate the fuel flow to the engine until such time as the signal from said ultraviolet light detector is removed.

2. A fuel modulating apparatus for modulating the normal fuel flow during periods of overcombustion in a turbine engine having an outer shell supporting a combustion section and a turbine section aft from the combustion section and further having a fuel supply including a fuel conduit means regulated by a fuel control for supplying fuel to the combustion section of the engine; said modulating apparatus comprising: a control valve in the fuel conduit means between the fuel control and the combustion section of the engine, said control valve having a normally open position permitting full normal fuel flow and a closed position reducing the otherwise normal fuel flow to a predetermined value, an ultraviolet light detector adapted for external mounting on the outer shell of the engine and axially located to be sensitive to the ultraviolet light radiated from the flame of combustion during an overcombustion condition, and a control unit disposed between said control valve and said ultraviolet light detector, said control unit receiving an output signal from said ultraviolet light detector during a period of overcombustion and actuating said control valve to the closed position for modulating the fuel flow to the engine until such time as the signal from said ultraviolet light detector is cancelled.

3. A fuel modulating apparatus for modulating the normal fuel flow during periods of overcombustion in a turbine engine having an outer shell supporting a combustion section and a turbine section aft from the combustion section and further having a fuel supply including a fuel conduit means regulated by a fuel control for supplying fuel to the combustion section of the engine; said modulating apparatus comprising: a control valve in the fuel conduit means between the fuel control and the combustion section of the engine, said control valve having a normally open position permitting full normal fuel flow and a closed position modulating the otherwise normal fuel flow to a predetermined value, a heat resistant transparent window means in the outer shell of the engine longitudinally located to be between the combustion section and the turbine in the engine, an ultraviolet light detector adapted for external engine mounting over said transparent window and oriented to be sensitive only to the ultraviolet light radiated from the flame of combustion when the flame is above normal length during an overcombustion condition, and a control unit disposed between said control valve and said ultraviolet light detector, said control unit receiving an output signal from said ultraviolet light detector during a period of overcombustion and actuating said control valve to the closed position for modulating the fuel flow to the engine until such time as the signal from said ultraviolet light detector is cancelled.

References Cited by the Examiner

UNITED STATES PATENTS

| | | |
|---|---|---|
| 2,507,359 | 5/50 | Weisz. |
| 2,524,100 | 10/50 | Dauvillier. |
| 2,797,336 | 6/57 | Loft. |
| 2,799,136 | 7/57 | De Boisblank. |
| 2,923,128 | 2/60 | Fortmann _____ 60—39.28 |
| 3,080,708 | 3/63 | Carr _____ 60—39.28 X |

FOREIGN PATENTS

| | | |
|---|---|---|
| 683,391 | 11/52 | Great Britain. |
| 734,020 | 7/55 | Great Britain. |

JULIUS E. WEST, *Primary Examiner.*

MARK NEWMAN, *Examiner.*